United States Patent
Gupta et al.

(10) Patent No.: US 12,448,582 B2
(45) Date of Patent: Oct. 21, 2025

(54) METHODS OF IMPROVING THE PERFORMANCE OF COMBUSTION ENGINE AFTER-TREATMENT DEVICES

(71) Applicant: Afton Chemical Corporation, Richmond, VA (US)

(72) Inventors: Ashutosh Gupta, Henrico, VA (US); Sheng Jiang, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 18/296,477

(22) Filed: Apr. 6, 2023

(65) Prior Publication Data

US 2024/0336862 A1  Oct. 10, 2024

(51) Int. Cl.
| | |
|---|---|
| *C10M 139/04* | (2006.01) |
| *B01D 53/94* | (2006.01) |
| *C10M 169/04* | (2006.01) |
| *F01N 3/021* | (2006.01) |
| *C10N 40/25* | (2006.01) |

(52) U.S. Cl.
CPC ....... *C10M 139/04* (2013.01); *B01D 53/9445* (2013.01); *C10M 169/04* (2013.01); *F01N 3/021* (2013.01); *B01D 2255/908* (2013.01); *B01D 2258/012* (2013.01); *C10M 2203/003* (2013.01); *C10M 2227/04* (2013.01); *C10N 2040/255* (2020.05)

(58) Field of Classification Search
CPC .......... B01D 2255/908; B01D 53/9445; B01D 2258/012; C10M 139/04; C10M 169/04; C10M 2227/04; C10M 2203/003; C10M 139/00; C10M 2229/041; C10N 2030/45; C10N 2030/50; C10N 2040/251; C10N 2040/255
See application file for complete search history.

(56) References Cited

U.S. PATENT DOCUMENTS

| | | | |
|---|---|---|---|
| 2,425,755 A | 8/1947 | Roberts et al. | |
| 2,425,845 A | 8/1947 | Toussaint et al. | |
| 2,448,664 A | 9/1948 | Fife et al. | |
| 2,457,139 A | 12/1948 | Fife et al. | |

(Continued)

FOREIGN PATENT DOCUMENTS

| | | |
|---|---|---|
| EP | 384086 A1 | 8/1990 |
| EP | 0529942 A1 | 3/1993 |

(Continued)

OTHER PUBLICATIONS

Campen et al., Growing use of synlubes, Special Report: Lubes for the Future, Hydrocarbon Processing, vol. 61, No. 2, Feb. 1982, pp. 75-82.

(Continued)

*Primary Examiner* — Phutthiwat Wongwian
*Assistant Examiner* — Diem T Tran
(74) *Attorney, Agent, or Firm* — Honigman LLP

(57) ABSTRACT

The present disclosure provides for methods of improving the performance of a combustion engine after-treatment device, such as particulate filters and/or three-way catalyst systems, over its useful life by using a lubricating oil composition including one or more base oils of lubricating viscosity and an additive package with increased amounts of least one oil-soluble silicon-containing compound.

9 Claims, 2 Drawing Sheets

(56) References Cited

U.S. PATENT DOCUMENTS

Figure 1:
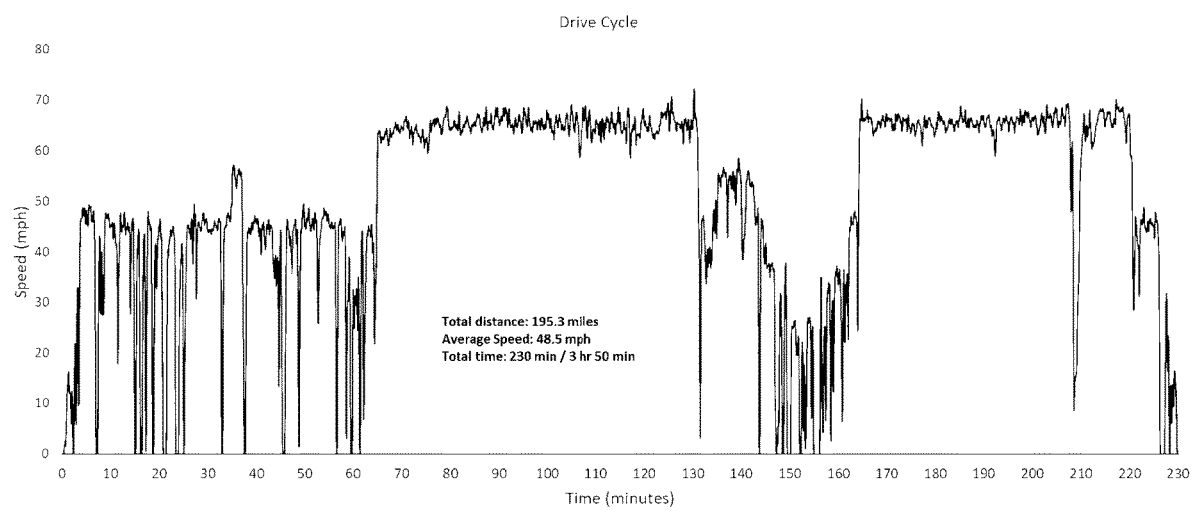

| | | | |
|---|---|---|---|
| 3,438,757 A | 4/1969 | Honnen et al. |
| 3,454,555 A | 7/1969 | van der Voort et al. |
| 3,485,601 A | 12/1969 | Mehmedbasich |
| 3,565,804 A | 2/1971 | Honnen et al. |
| 3,573,010 A | 3/1971 | Mehmedbasich |
| 3,574,576 A | 4/1971 | Honnen et al. |
| 3,671,511 A | 6/1972 | Honnen et al. |
| 3,746,520 A | 7/1973 | Medhmedbasich |
| 3,756,793 A | 9/1973 | Robinson |
| 3,763,244 A | 10/1973 | Shubkin |
| 3,780,128 A | 12/1973 | Shubkin |
| 3,844,958 A | 10/1974 | Anderson et al. |
| 3,849,085 A | 11/1974 | Kreuz et al. |
| 3,852,258 A | 12/1974 | Flay |
| 3,864,098 A | 2/1975 | Honnen |
| 3,876,704 A | 4/1975 | Nakaguchi |
| 3,884,647 A | 5/1975 | Nakaguchi |
| 3,898,056 A | 8/1975 | Honnen |
| 3,950,426 A | 4/1976 | Culbertson |
| 3,960,515 A | 6/1976 | Honnen |
| 4,022,589 A | 5/1977 | Alquist et al. |
| 4,039,300 A | 8/1977 | Chloupek et al. |
| 4,104,036 A | 8/1978 | Chao et al. |
| 4,128,403 A | 12/1978 | Honnen |
| 4,152,499 A | 5/1979 | Boerzel et al. |
| 4,166,726 A | 9/1979 | Harle |
| 4,168,242 A | 9/1979 | Soula |
| 4,172,855 A | 10/1979 | Gluckstein et al. |
| 4,191,537 A | 3/1980 | Lewis et al. |
| 4,218,330 A | 8/1980 | Shubkin |
| 4,231,759 A | 11/1980 | Udelhofen et al. |
| 4,236,020 A | 11/1980 | Lewis et al. |
| 4,238,628 A | 12/1980 | Cahill et al. |
| 4,288,612 A | 9/1981 | Lewis et al. |
| 4,361,028 A | 11/1982 | Kamiya |
| 4,605,808 A | 8/1986 | Samson |
| 4,747,297 A | 5/1988 | Okayama |
| 4,877,416 A | 10/1989 | Campbell et al. |
| 4,950,822 A | 8/1990 | Dileo et al. |
| 5,034,471 A | 7/1991 | Blackborow |
| 5,086,115 A | 2/1992 | Clarke |
| 5,089,029 A | 2/1992 | Hashimoto et al. |
| 5,112,364 A | 5/1992 | Rath et al. |
| 5,124,484 A | 6/1992 | Brown et al. |
| 5,196,170 A | 3/1993 | Patashnick |
| 5,300,701 A | 4/1994 | Cherpeck |
| 5,322,529 A | 6/1994 | Buckley, III |
| 5,514,190 A | 5/1996 | Cunningham et al. |
| 5,522,906 A | 6/1996 | Hashimoto et al. |
| 5,634,951 A | 6/1997 | Colucci et al. |
| 5,697,988 A | 12/1997 | Malfer et al. |
| 5,725,612 A | 3/1998 | Malfer et al. |
| 5,755,835 A | 5/1998 | Cherpeck |
| 5,814,111 A | 9/1998 | Graham et al. |
| 5,873,917 A | 2/1999 | Daly |
| 5,876,468 A | 3/1999 | Moreton |
| 6,048,373 A | 4/2000 | Malfer et al. |
| 7,157,919 B1 | 1/2007 | Walton |
| 9,587,190 B2 | 3/2017 | Meffert et al. |
| 10,029,246 B1 | 7/2018 | Dixon |
| 10,774,708 B2 | 9/2020 | Shao et al. |
| 10,774,722 B2 | 9/2020 | Shao et al. |
| 11,268,425 B2 | 3/2022 | Schulz |
| 11,401,855 B2 | 8/2022 | Shao et al. |
| 11,441,458 B2 | 9/2022 | Shao et al. |
| 2001/0029775 A1 | 10/2001 | Uchihara |
| 2002/0151442 A1 | 10/2002 | Bardasz et al. |
| 2004/0226354 A1 | 11/2004 | Schmidt |
| 2004/0237384 A1 | 12/2004 | Orr |
| 2005/0176594 A1* | 8/2005 | Grabowski ............... C10L 1/14 |
| | | | 508/215 |
| 2005/0247105 A1 | 11/2005 | Dikken |
| 2007/0056270 A1 | 3/2007 | Liimatta |
| 2007/0244016 A1* | 10/2007 | Buck ..................... C10M 163/00 |
| | | | 508/202 |
| 2007/0245721 A1 | 10/2007 | Colignon |
| 2008/0058232 A1* | 3/2008 | Yamaguchi .......... C10M 139/02 |
| | | | 508/202 |
| 2008/0300154 A1* | 12/2008 | Duchesne ............ C10M 159/24 |
| | | | 508/149 |
| 2009/0019831 A1 | 1/2009 | Heibel |
| 2010/0081588 A1* | 4/2010 | Yamaguchi .......... C10M 139/02 |
| | | | 508/202 |
| 2010/0126144 A1 | 5/2010 | He |
| 2010/0126145 A1 | 5/2010 | He |
| 2010/0266461 A1 | 10/2010 | Sappok |
| 2011/0162352 A1 | 7/2011 | Svensson |
| 2012/0083965 A1 | 4/2012 | Nevin |
| 2012/0083966 A1 | 4/2012 | Nevin |
| 2012/0083967 A1 | 4/2012 | Nevin |
| 2012/0084018 A1 | 4/2012 | Nevin |
| 2012/0159929 A1 | 6/2012 | Snopko |
| 2012/0159930 A1 | 6/2012 | Snopko |
| 2012/0192484 A1 | 8/2012 | Deng |
| 2013/0152546 A1 | 6/2013 | Korenev |
| 2013/0174641 A1 | 7/2013 | Asano et al. |
| 2014/0301924 A1 | 10/2014 | Morgan |
| 2015/0098870 A1* | 4/2015 | Lambert ............. B01D 53/9418 |
| | | | 502/67 |
| 2016/0123201 A1 | 5/2016 | Silver |
| 2016/0363019 A1 | 12/2016 | Warner et al. |
| 2018/0017012 A1 | 1/2018 | Suchta et al. |
| 2019/0112994 A1 | 4/2019 | Ruhland |
| 2019/0292959 A1 | 9/2019 | Dudar |
| 2020/0072112 A1 | 3/2020 | Shao |
| 2020/0191030 A1 | 6/2020 | Clowes |
| 2021/0071562 A1 | 3/2021 | Schulz |
| 2021/0230500 A1* | 7/2021 | Gupta .................. C10M 135/10 |
| 2021/0371765 A1 | 12/2021 | Remias |
| 2022/0034245 A1 | 2/2022 | Wang |
| 2022/0204884 A1 | 6/2022 | Takagi et al. |

FOREIGN PATENT DOCUMENTS

| | | | |
|---|---|---|---|
| EP | 1657291 A1 | | 5/2006 |
| EP | 2671638 | * | 12/2013 |
| JP | H08337788 A | | 12/1996 |
| JP | 2017031373 | * | 2/2017 |
| JP | 2021-116426 A | | 8/2021 |

OTHER PUBLICATIONS

Newton, Propylene Oxide Polymers and Higher 1,2-Epoxide Polymers, Kirk-Othmer Encyclopedia of Chemical Technology, Third Edition, 1982, pp. 633-645, vol. 18, John Wiley & Sons.

Gasoline Particulate Filter (GPF) How can the GPF cut emissions of ultrafine particles from gasoline engines?, AECC, Nov. 2017, pp. 1-10.

Environmental Protection Agency, Part IV, Rules and Regulations, Federal Register, vol. 71, No. 10, Jan. 17, 2006, pp. 2810-2842.

Luftschadstoffemissionen des Strassenverkehrs Folgearbeiten zum BUWAL-Bericht SRU Nr. 255; Real-world driving cycles for emission measurements: ARTEMIS and Swiss cycles; final report; Mar. 2001; 55 pages.

Notification of Transmittal of International Search Report and The Written Opinion of the International Searching Authority; International Application No. PCT/US2015/055221; date of mailing Dec. 28, 2015; 9 pages.

Development of a Predictive Model for Gasoline Vehicle Particulate Matter Emissions; SAE 2010-01-2115, Published Oct. 25, 2010; 13 pages.

Vehicle Particulate Emissions presentation dated Oct. 19, 2013; 31 pages.

Informal document No. GRPE-59-18 (59th GRPE, Expert meeting on Euro-5, Jan. 12, 2010,) Proposal of amendment to the Regulation No. 83 (Consolidated version); submitted by the experts from EC ; 282 pages.

Extended European Search Report for EP 24164413.7, dated Jul. 19, 2024.

* cited by examiner

METHODS OF IMPROVING THE PERFORMANCE OF COMBUSTION ENGINE AFTER-TREATMENT DEVICES

TECHNICAL FIELD

The present disclosure generally relates to lubricating oil compositions and methods of use thereof configured to improve the performance of an after-treatment device for a combustion engine, and in particular, using oil-soluble silicon-containing compounds in the lubricating oil compositions to improve the performance of the combustion engine after-treatment devices.

BACKGROUND

While conventional port fuel injection (PFI) gasoline engines tend to have extremely low particulate emissions, newer gasoline direct injection (GDI) engines and diesel engines tend to have higher particulate emissions in view of their combustion technologies. Various so-called after-treatment devices have been introduced to aid in reducing particulate and other exhaust emissions in both diesel and GDI engines. For instance, particulate filters are one such after-treatment device commonly used with the exhaust systems of diesel and/or GDI engines to trap and reduce particulate emissions. Three-way catalysts are another common after-treatment device often used to oxidize any partially combusted and/or unburnt components in the exhaust from such engines. However, the particulate filters and/or catalyst systems need to efficiently control vehicle emissions for a lengthy real-world service life, which can exceed 100,000 miles. Performance of the after-treatment devices, however, can be impacted by combustion byproducts resulting from, among other issues, the selected engine oil.

Evaluation of an after-treatment device can be assessed through a variety of performance tests and/or physical characterizations. Performance tests may include, for instance, measurement of oxygen storage capacity and/or light-off temperatures of a catalyst system. Physical characterization may include measurement of filter and/or catalyst surface area.

Oxygen Storage Capacity generally refers to the ability of a three-way catalyst after-treatment device to store excess oxygen under lean conditions and to release oxygen under rich conditions. The amount of oxygen storage and release decreases as the conversion capability of the three-way catalyst is reduced. Therefore, a decrease in a three-way catalyst's oxygen storage capacity over is useful life is undesired and a high oxygen storage capacity maintained for the in-service useful life of the after-treatment device is preferred.

Light-off temperature is another useful performance measure of a three-way catalyst. Light-off temperature is a measure of the exhaust gas temperature at which catalytic reactions are initiated within the three-way catalyst. The light-off temperature is generally the minimum temperature needed to oxidize products of incomplete combustion in the exhaust stream of the engine. Thus, a lower light-off temperature maintained over the useful life of the device is desired.

Filter or catalyst surface area is a physical characteristic of the after-treatment device that can used to evaluate device performance over time. Soot or ash from combustion can degrade surface area by plugging the filter or catalyst. The Brunauer-Emmett-Teller (BET) analysis is one method used to measure the surface area of solid or porous materials and can be useful to measure the surface area of automotive after-treatment devices such as particulate filters or three-way catalysts. A higher BET surface area of the catalyst or filter maintained over the useful life is desired.

SUMMARY

In accordance with one aspect, a method of improving the performance of an after-treatment device for a combustion engine is described herein. In one embodiment or approach of this aspect, the method includes lubricating the combustion engine with a lubricating oil composition and combusting a fuel in the lubricated engine generating an exhaust stream including soot and/or ash particles derived from the combustion, wherein the lubricating oil composition includes one or more base oils of lubricating viscosity and an additive package including at least one oil-soluble silicon-containing compound providing about 50 to about 500 ppm of silicon to the lubricating oil composition; contacting the after-treatment device with the exhaust stream including the soot and/or the ash particles from the combustion; and wherein the performance of the after-treatment device after at least about 120,000 miles of operation is improved as compared to the after-treatment device exposed to the exhaust stream from a combustion engine lubricated with a lubricating oil composition having about 10 ppm or less of silicon.

In other approaches or embodiments, the method of the previous paragraph may include optional embodiments, features, or method steps in any combination. These optional embodiments, features, or method steps may include one or more of the following: wherein the performance of the after-treatment device is improved as measured by at least one of surface area, oxygen storage capacity, or light-off temperature; and/or wherein the surface area of the after-treatment device after the at least about 120,000 miles of operation is substantially the same as an initial surface area of the after-treatment device; and/or wherein the oxygen storage capacity of the after-treatment device after the at least about 120,000 miles of operation is no more than 30 percent less than an initial oxygen storage capacity of the after-treatment device; and/or wherein a CO $T_{50}$ light-off temperature of the after-treatment device after the at least about 120,000 miles of operation is no more than 5 percent higher than an initial CO $T_{50}$ light-off temperature of the after-treatment device; and/or wherein the surface area of the after-treatment device is measured pursuant to a Brunauer-Emmett-Teller (BET) analysis; and/or wherein the BET surface area of the after-treatment device is about 20 $m^2 \, g_{cat}^{-1}$ or higher after the at least about 120,000 miles of operation; and/or wherein the BET surface area of the after-treatment device after the at least about 120,000 miles of operation is maintained at about 4 to about 10 percent of an initial BET surface area of the after-treatment device; and/or wherein the at least one oil-soluble silicon-containing compound provides about 150 to about 250 ppm of silicon to the lubricating oil composition; and/or wherein the after-treatment device is selected from a three-way catalytic converter, a particulate filter, or combinations thereof; and/or wherein the oil-soluble silicon-containing compound is an organosilane compound having a C6 to C20 hydrocarbyl chain; and/or wherein the organosilane compound is a C6-C20 hydrocarbyl silyl ether compound; and/or wherein the silyl ether compound is a tri-alkoxy (hydrocarbyl) silane; and/or wherein the silyl ether compound is a C14-C20 hydrocarbyl trimethoxy silane; and/or wherein the combustion engine is a gasoline engine or a diesel engine; and/or wherein the soot or ash particles have a diameter of about 10 nm or less; and/or wherein the soot or ash particles aggregate into particles having a diameter up to 200 micrometers; and/or wherein the exhaust stream has $1 \times 10^{12}$ to $1 \times 10^{13}$ of soot and/or ash as measured by particulate number (PN) during hot operation; and/or wherein the lubricating oil composition has a calculated SASH value of 0.4 to 2.0 weight percent (ASTM 874).

In another aspect, a lubricating oil composition configured to improve performance of an after-treatment device for a combustion engine is described herein. In embodiments or approaches of this further aspect, the lubricating oil composition includes one or more base oils of lubricating viscosity; one or more optional viscosity index improver additives; an additive package including one or more of a boronated and/or a non-boronated dispersant, an antioxidant, a friction modifier, one or more detergents, one or more antiwear agents, a pour point depressant, and antifoamant; at least one oil-soluble silicon-containing compound providing about 50 to about 500 ppm of silicon to the lubricating oil composition; and wherein, after contacting the after-treatment device with an exhaust stream including soot and/or ash particles from combusting a fuel in the combustion engine lubricated with the lubricating oil composition, the performance of the after-treatment device after at least about 120,000 miles of operation is improved as compared to the after-treatment device exposed to the exhaust stream from a combustion engine lubricated with a lubricating oil composition having about 10 ppm or less of silicon.

In other embodiments, the lubricating oil composition of the previous paragraph may include one or more optional features or embodiments in any combination. These optional features or embodiments may include one or more of the following: wherein the at least one oil-soluble silicon-containing compound provides about 150 to about 250 ppm of silicon to the lubricating oil composition; and/or wherein the oil-soluble silicon-containing compound is an organosilane compound having a C6 to C20 hydrocarbyl chain; and/or wherein the organosilane compound is a C6-C20 hydrocarbyl silyl ether compound; and/or wherein the silyl ether compound is a tri-alkoxy (hydrocarbyl) silane; and/or wherein the silyl ether compound is a C14-C20 hydrocarbyl trimethoxy silane.

In yet other embodiments, the use of any embodiment of the lubricating oil composition or method of this Summary is also described to improve the performance of an after-treatment device for a combustion engine wherein the improved performance of the after-treatment device is measured by at least one of surface area, oxygen storage capacity, or light-off temperature; and/or wherein the use achieves a surface area of the after-treatment device after the at least about 120,000 miles of operation substantially the same as an initial surface area of the after-treatment device; and/or wherein the use achieves an oxygen storage capacity of the after-treatment device after the at least about 120,000 miles of operation no more than 30 percent less than an initial oxygen storage capacity of the after-treatment device; and/or wherein the use achieves a CO $T_{50}$ light-off temperature of the after-treatment device after the at least about 120,000 miles of operation of no more than 5 percent higher than an initial CO $T_{50}$ light-off temperature of the after-treatment device; and/or wherein the surface area of the after-treatment device is measured pursuant to a Brunauer-Emmett-Teller (BET) analysis; and/or wherein the BET surface area of the after-treatment device is about 20 $m^2$ $g_{cat}^{-1}$ or higher after the at least about 120,000 miles of operation; and/or wherein the BET surface area of the after-treatment device after the at least about 120,000 miles of operation is maintained at about 4 to about 10 percent of an initial BET surface area of the after-treatment device.

Additional details and advantages of the disclosure will be set forth in part in the description that follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF DRAWING FIGURES

Figure 2:
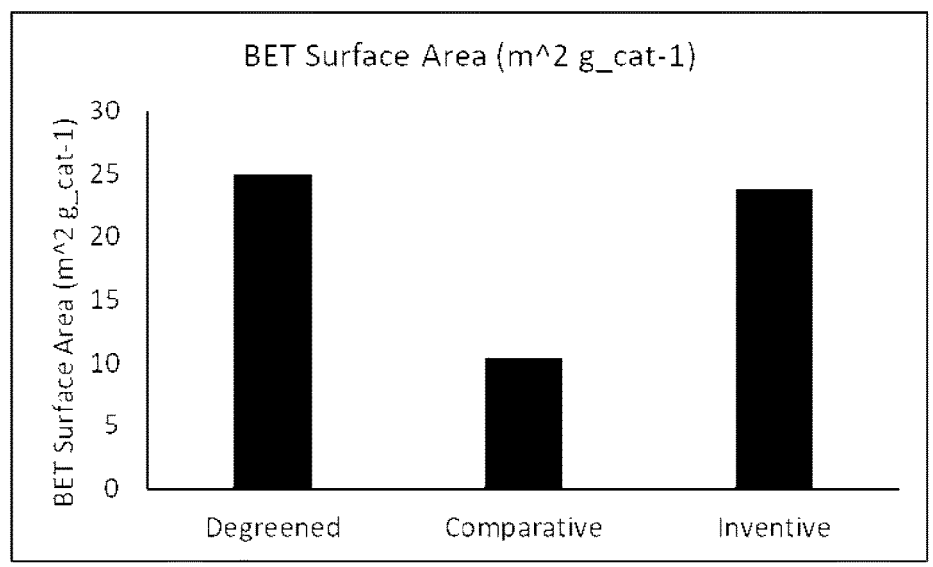
Figure 3:
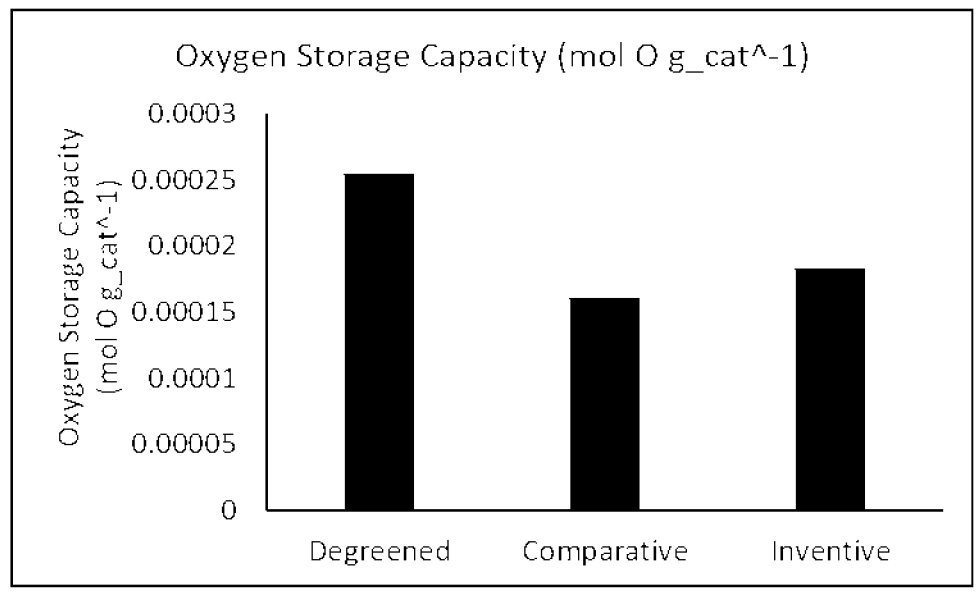
Figure 4:
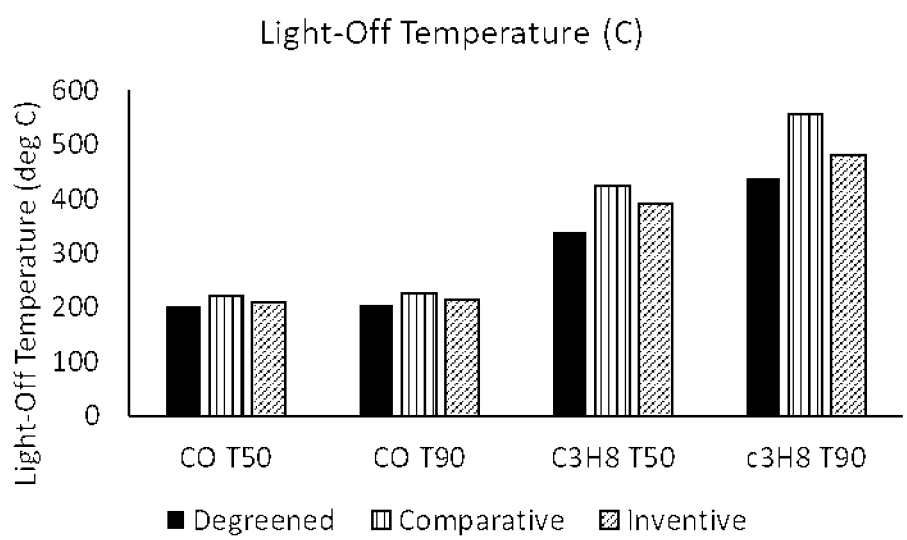

FIG. 1 is a speed vs time chart for an exemplary drive cycle used herein of Example 1;
FIG. 2 is a graph of BET surface area of Example 2;
FIG. 3 is a graph of oxygen storage capacity of Example 3; and
FIG. 4 is a graph of light-off temperature of Example 4.

DETAILED DESCRIPTION

The present disclosure provides for methods of improving the performance of a combustion engine after-treatment device, such as particulate filters and/or three-way catalyst systems, over its useful life by using a lubricating oil composition including one or more base oils of lubricating viscosity and an additive package with at least one oil-soluble silicon-containing compound providing about 50 to about 500 ppm of silicon to the lubricating oil composition. Surprisingly, higher amounts of silicon in the lubricating oil compositions resulted in improved performance of the after-treatment device even though the silicon likely results in higher ash content.

In approaches or embodiments herein, the methods include lubricating a combustion engine with the lubricating oil composition having the increased levels of silicon and combusting a fuel in the lubricated engine generating an exhaust stream including soot and/or ash particles derived from the combustion. The after-treatment device is then contacted with the exhaust stream including the soot and/or ash particles from the combustion, and the performance of the after-treatment device is improved as compared to the after-treatment device exposed to an exhaust stream from a combustion engine lubricated with a lubricating oil composition having negligible levels of silicon (such as, about 10 ppm or less of silicon). As discussed herein, performance of the after-treatment device is measured after at least about 120,000 miles (preferably about at least about 125,000 miles) of engine operation pursuant to a suitable drive cycle such as, but not limited to, an EPA Federal Test Procedure (e.g., FTP-75), the Common Artemis Driving Cycle (CADC), or other suitable drive cycle. Performance of the after-treatment device is improved when measured using one or more of oxygen storage capacity, light-off temperature, and/or BET surface area and, surprisingly, higher levels of silicon in the engine oil lubricant improved performance of the filter or catalyst as compared to engine oils with lower levels of silicon.

As silicon is an inorganic material that would not be combusted in the engine, it would have been expected that higher levels of silicon in the engine oil would have negatively impacted performance of the after-treatment device by forming higher levels of ash that would degrade oxygen storage capacity, light-off temperature, and/or surface area of the after-treatment devices over the useful life. However, it was discovered herein, on the other hand, that the higher amounts of silicon from an oil-soluble silicon-containing compound in an engine oil actually maintained or improved performance of the after-treatment as compared to the initial performance of the after-treatment device or at least resulted in better performance as compared to an engine oil with negligible levels of silicon (i.e., about 10 ppm or less). The lubricating oil compositions herein may have a calculated SASH value of about 0.4 to about 2.0 weight percent, or about 0.4 to about 1.0, or about 0.4 to about 0.8 weight percent as measured pursuant to ASTM D874.

Particulate emissions of a combustion engine exhaust stream generally include soot particles and ash particles, which can aggregate to form larger aggregate particles. In some approaches and embodiments herein, primary soot and ash particles of the exhaust streams typically have a diameter of less than about 10 nm. In other embodiments, aggregate particles, if any, can have an average primary particle diameter of from about 7 nm to about 60 nm. In yet further embodiments, the primary particles may also, in some circumstances, associate to form aggregates that can have a diameter up to or even exceeding about 200 nm, according to, e.g., a 2017 publication by the Association for Emissions Control by Catalyst (AECC) entitled "Gasoline Particulate Filter (GPF): How can the GPF cut emissions of ultrafine particles from gasoline engines." In yet further approaches, the exhaust streams herein may include a plurality of particles, wherein each particle of the plurality of particles has a diameter from about 0.01 micrometers to about 200 micrometers. In other approaches, each particle in the plurality of particles has a diameter from about 0.05 micrometers to about 95 micrometers, from about 0.10 micrometers to about 90 micrometers, from about 0.15 micrometers to about 85 micrometers, or from about 0.20 micrometers to about 80 micrometers. In some approaches, at least 99% of the particles in the plurality of particles have an average diameter as specified above. In other approaches, at least 98%, at least 97%, at least 96%, or at least 95% of the particles in the plurality of particles have an average diameter as specified herein. In some approaches, no more than 5% of the particles have an average diameter greater than 200 micrometers. In some approaches, no more than 5% of the particles have an average diameter less than 0.01 micrometers. In yet other approaches, the combustion exhaust stream may have about $1 \times 10^{12}$ to about $1 \times 10^{13}$ of soot and/or ash particles as measured by particulate number (PN) during hot operation.

Oil-Soluble Silicon-Containing Compound

In approaches or embodiments, the oil-soluble silicon-containing compounds useful for the lubricating oil compositions herein to improve performance of the after-treatment device may be one or more organosilane compounds, such as one or more hydrocarbyl silyl ether compounds having a C6 to C20 hydrocarbyl chain. For instance, the hydrocarbyl silyl ether may be a tri-alkoxy (hydrocarbyl) silane, such as a C10-C20 hydrocarbyl trimethoxy saline or more preferably, a C14-C20 hydrocarbyl trimethoxy silane, and most preferably hexadecyl trimethoxy silane.

In other approaches or embodiments, the oil-soluble silicon-containing compound of the present disclosure may have the structure of the Formula I:

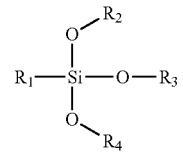

(Formula I)

wherein $R_1$ is an hydrocarbyl group including 2 to 20 carbon atoms (preferably, an alkyl group having 6 to 20 carbons, 10 to 20 carbons, or 16 to 18 carbons), and $R_2$, $R_3$, and $R_4$ are each independently selected from hydrocarbyl group having 1 to 10 carbons (preferably, an alkyl group having 1 to 3 carbons, and more preferably a methyl group). Optionally, $R_1$ may be an alkyl group selected from ethyl, propyl, butyl, pentyl, hexyl, heptyl, octyl, nonyl, decyl, undecyl, dodecyl, tridecyl, tetradecyl, pentadecyl, hexadecyl, heptadecyl, octyldecyl, nonadecyl, or eicosyl, and $R_2$, $R_3$, and $R_4$ may be, independently, alkyl groups selected from methyl, ethyl, and propyl. Preferably, $R_1$ is an alkyl group selected from undecyl, dodecyl, tridecyl, tetradecyl, pentadecyl, hexadecyl, heptadecyl, octyldecyl, and $R_2$, $R_3$, and $R_4$ are methyl groups.

In yet other approaches, the oil-soluble silicon-containing compounds of the present disclosure may have an average number molecular weight of 100 to 400 g/mol, as determined by GPC. Suitable examples of such oil-soluble silicon-containing compounds may be, but not limited to hexadecyl-trimethoxysilane, octyltriethoxysilane, nonyltriethoxysilane, n-decyltriethoxysilane, undecyl-triethoxysilane, and tetradecyltriethoxysilane. Preferably, the oil-soluble silicon-containing compounds of the present disclosure are selected from undecyl-triethoxysilane, tetradecyltriethoxysilane, and hexadecyltrimethoxysilane.

In some embodiments, suitable organosilanes include one organic substituent and three hydrolysable substituents. In yet other embodiments, exemplary organosilanes may include, but are not limited to, the following compounds: [2-(3-cyclohexenyl)ethyl]trimethoxysilane, trimethoxy (7-octen-1-yl) silane, isooctyl trimethoxy-silane, N-(3-triethoxysilylpropyl) methoxyethoxyethoxyethyl carbamate, N-(3-triethoxysilylpropyl) methoxyethoxyethoxyethyl carbamate, 3-(methacryloyloxy) propyltrimethoxysilane, allyl trimethoxysilane, 3-acryloxypropyltrimethoxysilane, 3-(methacryloyloxy) propyltriethoxysilane, 3-(methacryloyloxy) propylmethyldiethoxysilane, 3-acryloyloxypropyl) methyldimethoxysilane, -9-3-(methacryloyloxy) propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, isooctyltrimethoxysilane, octadecyltrimethoxysilane, propyltrimethoxysilane, hexyltrimethoxysilane, vinylmethyldiacetoxysilane, vinylmethyldimethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropen-oxysilane, vinyltris(2-methoxyethoxy) silane, styrylethyltrimethoxysilane, mercaptopropyl-trimethoxysilane, 3-glycidoxypropyltrimethoxysilane, heptamethyl (2-ltris(2-methoxyethoxy) silyllethylltrisiloxane (as described in US 2003/0220204) polydimethylsiloxane, arylsilanes, including, for instance, substituted and unsubstituted arylsilanes, alkylsilanes, including, substituted and unsubstituted alkyl silanes, including, methoxy and hydroxy substituted alkyl silanes, and/or combinations of two or more of the foregoing compounds.

In approaches or embodiments, the oil-soluble silicon-containing compound is present in an amount sufficient to provide about 50 ppm to about 500 ppm of silicon to the lubricating oil composition, in other approaches, about 100 ppm to about 500 ppm of silicon, about 150 ppm to about 250 ppm of silicon, or in yet other approaches, about 180 ppm to about 220 ppm of silicon, based on the total weight of the lubricating oil composition.

Such high treat rates of the silicon in the lubricating compositions herein surprisingly provide a measured surface area using the Brunauer-Emmett-Teller (BET) analysis of the after-treatment device after at least about 120,000 miles of useful file that is substantially the same as the initial measured surface area of the after-treatment device. As used herein, substantially the same in the context of BET filter surface area is considered within about 10 percent, within about 8 percent, or within about 5 percent of an initial surface area (or de-greened surface area as set forth in the Example) of the after-treatment device when measured pursuant to a Brunauer-Emmett-Teller (BET) analysis. In other approaches, the BET surface area of the after-treatment device is about 20 m$^2$ g$_{cat}^{-1}$ or higher after at least 120,000 miles (preferably, about 20 to about 25 m$^2$ g$_{cat}^{-1}$). In yet other approaches, the BET surface area of the after-treatment device after 120,000 miles of operation is maintained at about 4 to about 10 percent of the initial or de-greened BET surface area of the after-treatment device. Surprisingly, lower amounts of the silicon-containing compound in the lubricating composition actually results in lower BET surface area after at least about 120,000 miles, which means that the after-treatment device has more of its pores plugged when the engine is lubricated with a composition having a lower concentration of silicon, such as lubricating oil compositions having about 10 ppm or less of silicon. In comparison and as shown in the Examples herein, BET surface area of filters exposed to an exhaust gas from an engine using a comparative lubricant with negligible levels of silicon (e.g., about 10 ppm or less) had a much lower surface area of 10.4 m$^2$ g$_{cat}^{-1}$ after at least about 120,000 miles of operation.

Such high treat rates of silicon also surprisingly maintain low light-off temperatures of a three-way catalyst after at least about 120,000 miles of useful file as compared to a lubricant having negligible levels of silicon (such as 10 ppm or less). As mentioned above, light-off temperature is a measure of the exhaust gas temperature needed to oxidize products of incomplete combustion, such as CO and $C_3H_8$, and commonly reported at the $T_{50}$ or the $T_{90}$ temperatures (where $T_{50}$ refers to the temperature in Celsius where 50% of the CO or $C_3H_8$ is converted and $T_{90}$ refers to the temperature in Celsius where 90% of the CO or $C_3H_8$ is converted).

The lubricants herein with the high treat rates of silicon minimize any increase in light-off temperatures after at least about 120,000 miles of engine operation. For instance and as shown in the Example below, the CO $T_{50}$ and $T_{90}$ light-off temperatures only increased about 3 to about 5 percent, and the $C_3H_8$ $T_{50}$ and $T_{90}$ light temperatures only increased about 9 to about 18 percent after at least about 120,000 miles of operation when using the lubricating compositions herein with the higher levels of silicon. In contrast and as shown in the Examples below, comparative lubricants with the negligible levels of silicon (e.g., about 10 ppm or less) had about 9 percent or more increase in the CO $T_{50}$ and $T_{90}$ temperatures, and 25 percent or more increases in the $C_3H_8$ $T_{50}$ and $T_{90}$ light-off temperatures. For instance and in some embodiments after at least about 120,000 miles, the CO $T_{50}$ measured light-off temperatures for the lubricants herein were about 208° C. to about 212° C., the CO $T_{90}$ measured light-off temperatures of the lubricants herein were about 210° C. to about 218° C., the $C_3H_8$ $T_{50}$ measured light-off temperatures of the lubricants herein were about 388° C. to about 395° C., and the $C_3H_8$ $T_{90}$ measured light-off temperatures of the lubricants herein were about 475° C. to about 485° C.

The high treat rates of silicon also surprisingly maintain high levels of the oxygen storage capacity of a three-way catalyst after at least about 120,000 miles of useful file. As noted above, oxygen storage capacity is the ability of a catalyst to oxidize partially combusted and/or unburnt components in the exhaust from an engine and is commonly reported in mols of oxygen per gram of catalyst. Maintaining a high oxygen storage capacity over the useful life of the catalyst is desired, and the lubricating compositions herein with the high treat rates of silicon minimized the degradation of oxygen storage capacity. As shown in the Examples, the lubricants herein had less than about 30 percent decrease in oxygen storage capacity after at least about 120,000 miles of operation, while lubricants with the negligible levels of silicon (e.g., about 10 ppm or less) had over 35 percent decrease in the oxygen storage capacity. For instance and in some embodiment after at least about 120,000 miles, the lubricants herein achieved a measured oxygen storage capacity of about 0.000180 mol oxygen/g$_{cat}$ to about 0.000190 mols oxygen/g$_{cat}$. On the other hand, comparative lubricants having the negligible levels of silicon (e.g., about 10 ppm or less) had lower oxygen storage capacity of 0.000161 mols oxygen/g$_{cat}$.

As shown in the Examples herein, the improvement in performance of the after-treatment devices when using a lubricant with the higher levels of silicon was unexpected because the silicon would likely have resulted in higher levels of ash that would have been expected to degrade performance of the filter or catalyst.

Hydrocarbon Fuels

The fuels suitable for the present methods may be applicable to the operation of diesel, jet, or gasoline engines. The engines may include both stationary engines (e.g., engines used in electrical power generation installations, in pumping stations, etc.) and ambulatory engines (e.g., engines used as prime movers in automobiles, trucks, road-grading equipment, military vehicles, etc.). For example, the fuels may include any and all middle distillate fuels, diesel fuels, biorenewable fuels, biodiesel fuel, fatty acid alkyl ester, gas-to-liquid (GTL) fuels, gasoline, jet fuel, alcohols, ethers, kerosene, low sulfur fuels, synthetic fuels, such as Fischer-Tropsch fuels, liquid petroleum gas, bunker oils, coal to liquid (CTL) fuels, biomass to liquid (BTL) fuels, high asphaltene fuels, fuels derived from coal (natural, cleaned, and petcoke), genetically engineered biofuels and crops and extracts therefrom, and natural gas. "Biorenewable fuels" as used herein is understood to mean any fuel which is derived from resources other than petroleum. Such resources include, but are not limited to, corn, maize, soybeans and other crops; grasses, such as switchgrass, miscanthus, and hybrid grasses; algae, seaweed, vegetable oils; natural fats; and mixtures thereof. In an aspect, the biorenewable fuel can comprise monohydroxy alcohols, such as those comprising from 1 to about 5 carbon atoms. Non-limiting examples of suitable monohydroxy alcohols include methanol, ethanol, propanol, n-butanol, isobutanol, t-butyl alcohol, amyl alcohol, and isoamyl alcohol. Preferred fuels for the methods herein include gasoline or diesel fuels.

The fuels of the present disclosure may include one or more additives. For example, the fuels may contain conventional quantities of cetane improvers, octane improvers, corrosion inhibitors, cold flow improvers (CFPP additive), pour point depressants, solvents, demulsifiers, lubricity additives, friction modifiers, amine stabilizers, combustion improvers, detergents, dispersants, antioxidants, heat stabilizers, conductivity improvers, metal deactivators, marker dyes, organic nitrate ignition accelerators, cyclomatic manganese tricarbonyl compounds, carrier fluids, and the like, as appropriate for the type of fuel. Similarly, the fuels may contain suitable amounts of conventional fuel blending components such as methanol, ethanol, dialkyl ethers, 2-ethylhexanol, and the like.

In some approaches, organic nitrate ignition accelerators that include aliphatic or cycloaliphatic nitrates in which the aliphatic or cycloaliphatic group is saturated, and that contain up to about 12 carbons may be used. Examples of organic nitrate ignition accelerators that may be used are methyl nitrate, ethyl nitrate, propyl nitrate, isopropyl nitrate, allyl nitrate, butyl nitrate, isobutyl nitrate, sec-butyl nitrate, tert-butyl nitrate, amyl nitrate, isoamyl nitrate, 2-amyl nitrate, 3-amyl nitrate, hexyl nitrate, heptyl nitrate, 2-heptyl nitrate, octyl nitrate, isooctyl nitrate, 2-ethylhexyl nitrate, nonyl nitrate, decyl nitrate, undecyl nitrate, dodecyl nitrate, cyclopentyl nitrate, cyclohexyl nitrate, methylcyclohexyl nitrate, cyclododecyl nitrate, 2-ethoxyethyl nitrate, 2-(2-ethoxyethoxy)ethyl nitrate, tetrahydrofuranyl nitrate, and the like. Mixtures of such materials may also be used.

Examples of suitable optional metal deactivators useful in the compositions of the present application are disclosed in U.S. Pat. No. 4,482,357, the disclosure of which is herein incorporated by reference in its entirety. Such metal deactivators include, for example, salicylidene-o-aminophenol, disalicylidene ethylenediamine, disalicylidene propylenediamine, and N,N'-disalicylidene-1,2-diaminopropane.

Suitable optional cyclomatic manganese tricarbonyl compounds which may be employed in the compositions of the present application include, for example, cyclopentadienyl manganese tricarbonyl, methylcyclopentadienyl manganese tricarbonyl, indenyl manganese tricarbonyl, and ethylcyclopentadienyl manganese tricarbonyl. Yet other examples of suitable cyclomatic manganese tricarbonyl compounds are disclosed in U.S. Pat. Nos. 5,575,823 and 3,015,668 both of which disclosures are herein incorporated by reference in their entirety.

Commercially available detergents may be used in the fuels herein. Such detergents include but are not limited to succinimides, Mannich base detergents, PIB amine, quaternary ammonium salt detergents, bis-aminotriazole detergents as generally described in U.S. patent application Ser. No. 13/450,638, and a reaction product of a hydrocarbyl substituted dicarboxylic acid, or anhydride and an aminoguanidine, wherein the reaction product has less than one equivalent of amino triazole group per molecule as generally described in U.S. patents application Ser. Nos. 13/240,233 and 13/454,697.

The fuels herein may also include other optional additives as needed for a particular application and may include as needed one or more of a demulsifier, a corrosion inhibitor, an antiwear additive, an antioxidant, a metal deactivator, an antistatic additive, a dehazer, an antiknock additive, a lubricity additive, and/or a combustion improver.

Base Oil or Base Oil Blend of the Lubricating Composition:

The lubricating oil compositions herein include a base oil or a blend of base oils combined with an additive package including the one or more oil-soluble silicon-containing compounds. A base oil herein may be one or more oils of lubricating viscosity and selected from any of the base oils in API Groups I to V as specified in the American Petroleum Institute (API) Base Oil Interchangeability Guidelines. In some embodiments, the base oil blends herein, in some approaches or embodiments, including any selected base oil to generate a lubricant have a KV100 (ASTM D445) of about 2 to about 20 cSt, in other approaches, about 5 to about 15 cSt, about 8 to about 15 cSt, in yet other approaches, about 10 to about 15 cSt. As known, the five base oil groups are generally set forth in Table 1 below:

TABLE 1

| Base oil Category | Sulfur (%) | | Saturates (%) | Viscosity Index |
|---|---|---|---|---|
| Group I | >0.03 | and/or | <90 | 80 to 120 |
| Group II | ≤0.03 | and | >90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry. Group II+ may comprise high viscosity index Group II.

The base oil blend used in the disclosed lubricating oil composition may be a mineral oil, animal oil, vegetable oil, synthetic oil, synthetic oil blends, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example, such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II, a Group III, a Group IV, a Group V, and a combination of two or more of the foregoing, and wherein the major amount of base oil is other than base oils that arise from provision of additive components or viscosity index improvers in the composition.

The amount of the oil of lubricating viscosity present may be the balance remaining after subtracting from 100 wt % the sum of the amount of the performance additives inclusive of viscosity index improver(s) and/or pour point depressant(s) and/or other top treat additives. For example, the oil of lubricating viscosity that may be present in a finished fluid may be a major amount, such as greater than about 50 wt %, greater than about 60 wt %, greater than about 70 wt %, greater than about 80 wt %, greater than about 85 wt %, or greater than about 90 wt %.

As generally used herein, the terms "oil composition," "lubrication composition," "lubricating oil composition," "lubricating oil," "lubricant composition," "lubricant," and "lubricating" are considered synonymous, fully interchangeable terminology referring to a passenger car motor oil lubrication product comprising a major amount of a base oil component having the blend amounts noted above plus minor amounts of the detergents and the other optional components that is preferably API GF-6 capable.

Optional Additives of the Lubricating Composition:

The lubricating compositions herein may also include a number of optional additives in addition to the oil-soluble silicon-containing compounds to meet performance standards. Those optional additives are described in the following paragraphs.

Dispersants: The lubricating oil composition may optionally include one or more other dispersants or mixtures thereof. Dispersants are often known as ashless-type dispersants because, prior to mixing in a lubricating oil composition, they do not contain ash-forming metals and they do not normally contribute any ash when added to a lubricant. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include polyisobutylene succinimide with the number average molecular weight of the polyisobutylene substituent being in the range about 350 to about 50,000, or to about 5,000, or to about 3,000, as measured by GPC. Succinimide dispersants and their preparation are disclosed, for instance in U.S. Pat. No. 7,897,696 or U.S. Pat. No. 4,234,435. The alkenyl substituent may be prepared from polymerizable monomers containing about 2 to about 16, or about 2 to about 8, or about 2 to about 6 carbon atoms. Succinimide dispersants are typically the imide formed from a polyamine, typically a poly(ethyleneamine).

Preferred amines are selected from polyamines and hydroxylamines. Examples of polyamines that may be used include, but are not limited to, diethylene triamine (DETA), triethylene tetramine (TETA), tetraethylene pentamine (TEPA), and higher homologues such as pentaethylamine hexamine (PEHA), and the like.

A suitable heavy polyamine is a mixture of polyalkylenepolyamines comprising small amounts of lower polyamine oligomers such as TEPA and PEHA (pentaethylene hexamine) but primarily oligomers with 6 or more nitrogen atoms, 2 or more primary amines per molecule, and more extensive branching than conventional polyamine mixtures. A heavy polyamine preferably includes polyamine oligomers containing 7 or more nitrogen atoms per molecule and with 2 or more primary amines per molecule. The heavy polyamine comprises more than 28 wt. % (e.g., >32 wt. %) total nitrogen and an equivalent weight of primary amine groups of 120-160 grams per equivalent.

In some approaches, suitable polyamines are commonly known as PAM and contain a mixture of ethylene amines where TEPA and pentaethylene hexamine (PEHA) are the major part of the polyamine, usually less than about 80%.

Typically, PAM has 8.7-8.9 milliequivalents of primary amine per gram (an equivalent weight of 115 to 112 grams per equivalent of primary amine) and a total nitrogen content of about 33-34 wt. %. Heavier cuts of PAM oligomers with practically no TEPA and only very small amounts of PEHA but containing primarily oligomers with more than 6 nitrogen atoms and more extensive branching, may produce dispersants with improved dispersancy.

In an embodiment the present disclosure further comprises at least one polyisobutylene succinimide dispersant derived from polyisobutylene with a number average molecular weight in the range about 350 to about 50,000, or to about 5000, or to about 3000, as determined by GPC. The polyisobutylene succinimide may be used alone or in combination with other dispersants.

In some embodiments, polyisobutylene, when included, may have greater than 50 mol %, greater than 60 mol %, greater than 70 mol %, greater than 80 mol %, or greater than 90 mol % content of terminal double bonds. Such PIB is also referred to as highly reactive PIB ("HR-PIB"). HR-PIB having a number average molecular weight ranging from about 800 to about 5000, as determined by GPC, is suitable for use in embodiments of the present disclosure. Conventional PIB typically has less than 50 mol %, less than 40 mol %, less than 30 mol %, less than 20 mol %, or less than 10 mol % content of terminal double bonds.

An HR-PIB having a number average molecular weight ranging from about 900 to about 3000 may be suitable, as determined by GPC. Such HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermal ene reaction, HR-PIB may lead to higher conversion rates in the reaction, as well as lower amounts of sediment formation, due to increased reactivity. A suitable method is described in U.S. Pat. No. 7,897,696.

In one embodiment, the present disclosure further comprises at least one dispersant derived from polyisobutylene succinic anhydride ("PIBSA"). The PIBSA may have an average of between about 1.0 and about 2.0 succinic acid moieties per polymer.

The % actives of the alkenyl or alkyl succinic anhydride can be determined using a chromatographic technique. This method is described in column 5 and 6 in U.S. Pat. No. 5,334,321.

The percent conversion of the polyolefin is calculated from the % actives using the equation in column 5 and 6 in U.S. Pat. No. 5,334,321.

Unless stated otherwise, all percentages are in weight percent and all molecular weights are number average molecular weights determined by gel permeation chromatography (GPC) using commercially available polystyrene standards (with a number average molecular weight of 180 to about 18,000 as the calibration reference).

In one embodiment, the dispersant may be derived from a polyalphaolefin (PAO) succinic anhydride. In one embodiment, the dispersant may be derived from olefin maleic anhydride copolymer. As an example, the dispersant may be described as a poly-PIBSA. In an embodiment, the dispersant may be derived from an anhydride which is grafted to an ethylene-propylene copolymer.

A suitable class of nitrogen-containing dispersants may be derived from olefin copolymers (OCP), more specifically, ethylene-propylene dispersants which may be grafted with maleic anhydride. A more complete list of nitrogen-containing compounds that can be reacted with the functionalized OCP are described in U.S. Pat. Nos. 7,485,603; 7,786,057; 7,253,231; 6,107,257; and 5,075,383; and/or are commercially available.

One class of suitable dispersants may also be Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

A suitable class of dispersants may also be high molecular weight esters or half ester amides. A suitable dispersant may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726; 7,214,649; and 8,048,831 are incorporated herein by reference in their entireties.

In addition to the carbonate and boric acids post-treatments both the compounds may be post-treated, or further post-treatment, with a variety of post-treatments designed to improve or impart different properties. Such post-treatments include those summarized in columns 27-29 of U.S. Pat. No. 5,241,003, hereby incorporated by reference. Such treatments include, treatment with: Inorganic phosphorous acids or anhydrates (e.g., U.S. Pat. Nos. 3,403,102 and 4,648,980); Organic phosphorous compounds (e.g., U.S. Pat. No. 3,502,677); Phosphorous pentasulfides; Boron compounds as already noted above (e.g., U.S. Pat. Nos. 3,178,663 and 4,652,387); Carboxylic acid, polycarboxylic acids, anhydrides and/or acid halides (e.g., U.S. Pat. Nos. 3,708,522 and 4,948,386); Epoxides polyepoxiates or thioexpoxides (e.g., U.S. Pat. Nos. 3,859,318 and 5,026,495); Aldehyde or ketone (e.g., U.S. Pat. No. 3,458,530); Carbon disulfide (e.g., U.S. Pat. No. 3,256,185); Glycidol (e.g., U.S. Pat. No. 4,617,137); Urea, thiourea or guanidine (e.g., U.S. Pat. Nos. 3,312,619; 3,865,813; and British Patent GB 1,065,595); Organic sulfonic acid (e.g., U.S. Pat. No. 3,189,544 and British Patent GB 2,140,811); Alkenyl cyanide (e.g., U.S. Pat. Nos. 3,278,550 and 3,366,569); Diketene (e.g., U.S. Pat. No. 3,546,243); A diisocyanate (e.g., U.S. Pat. No. 3,573,205); Alkane sultone (e.g., U.S. Pat. No. 3,749,695); 1,3-Dicarbonyl Compound (e.g., U.S. Pat. No. 4,579,675); Sulfate of alkoxylated alcohol or phenol (e.g., U.S. Pat. No. 3,954,639); Cyclic lactone (e.g., U.S. Pat. Nos. 4,617,138; 4,645,515; 4,668,246; 4,963,275; and 4,971,711); Cyclic carbonate or thiocarbonate linear monocarbonate or polycarbonate, or chloroformate (e.g., U.S. Pat. Nos. 4,612,132; 4,647,390; 4,648,886; 4,670,170); Nitrogen-containing carboxylic acid (e.g., U.S. Pat. No. 4,971,598 and British Patent GB 2,140,811); Hydroxy-protected chlorodicarbonyloxy compound (e.g., U.S. Pat. No. 4,614,522); Lactam, thiolactam, thiolactone or dithiolactone (e.g., U.S. Pat. Nos. 4,614,603 and 4,666,460); Cyclic carbonate or thiocarbonate, linear monocarbonate or polycarbonate, or chloroformate (e.g., U.S. Pat. Nos. 4,612,132; 4,647,390; 4,646,860; and 4,670,170); Nitrogen-containing carboxylic acid (e.g., U.S. Pat. No. 4,971,598 and British Patent GB 2,440,811); Hydroxy-protected chlorodicarbonyloxy compound (e.g., U.S. Pat. No. 4,614,522); Lactam, thiolactam, thiolactone or dithiolactone (e.g., U.S. Pat. Nos. 4,614,603, and 4,666,460); Cyclic carbamate, cyclic thiocarbamate or cyclic dithiocarbamate (e.g., U.S. Pat. Nos. 4,663,062 and 4,666,459); Hydroxyaliphatic carboxylic acid (e.g., U.S. Pat. Nos. 4,482,464; 4,521,318; 4,713,189); Oxidizing agent (e.g., U.S. Pat. No. 4,379,064); Combination of phosphorus pentasulfide and a polyalkylene polyamine (e.g., U.S. Pat. No. 3,185,647); Combination of carboxylic acid or an aldehyde or ketone and sulfur or sulfur chloride (e.g., U.S. Pat. Nos. 3,390,086; 3,470,098); Combination of a hydrazine and carbon disulfide (e.g. U.S. Pat. No. 3,519,564); Combination of an aldehyde and a phenol (e.g., U.S. Pat. Nos. 3,649,229; 5,030,249; 5,039,307); Combination of an aldehyde and an O-diester of dithiophosphoric acid (e.g., U.S. Pat. No. 3,865,740); Combination of a hydroxyaliphatic carboxylic acid and a boric acid (e.g., U.S. Pat. No. 4,554,086); Combination of a hydroxyaliphatic carboxylic acid, then formaldehyde and a phenol (e.g., U.S. Pat. No. 4,636,322); Combination of a hydroxyaliphatic carboxylic acid and then an aliphatic dicarboxylic acid (e.g., U.S. Pat. No. 4,663,064); Combination of formaldehyde and a phenol and then glycolic acid (e.g., U.S. Pat. No. 4,699,724); Combination of a hydroxyaliphatic carboxylic acid or oxalic acid and then a diisocyanate (e.g. U.S. Pat. No. 4,713,191); Combination of inorganic acid or anhydride of phosphorus or a partial or total sulfur analog thereof and a boron compound (e.g., U.S. Pat. No. 4,857,214); Combination of an organic diacid then an unsaturated fatty acid and then a nitroaromatic amine optionally followed by a boron compound and then a glycolating agent (e.g., U.S. Pat. No. 4,973,412); Combination of an aldehyde and a triazole (e.g., U.S. Pat. No. 4,963,278); Combination of an aldehyde and a triazole then a boron compound (e.g., U.S. Pat. No. 4,981,492); Combination of cyclic lactone and a boron compound (e.g., U.S. Pat. Nos. 4,963,275 and 4,971,711). The above-mentioned patents are herein incorporated in their entireties.

The TBN of a suitable dispersant may be from about 10 to about 65 mg KOH/g dispersant, on an oil-free basis, which is comparable to about 5 to about 30 TBN if measured on a dispersant sample containing about 50% diluent oil. TBN is measured by the method of ASTM D2896.

In yet other embodiments, the optional dispersant additive may be a hydrocarbyl substituted succinamide or succinimide dispersant. In approaches, the hydrocarbyl substituted succinamide or succinimide dispersant may be derived from a hydrocarbyl substituted acylating agent reacted with a polyalkylene polyamine and wherein the hydrocarbyl substituent of the succinamide or the succinimide dispersant is a linear or branched hydrocarbyl group having a number average molecular weight of about 250 to about 5,000 as measured by GPC using polystyrene as a calibration reference.

In some approaches, the polyalkylene polyamine used to form the dispersant has the Formula

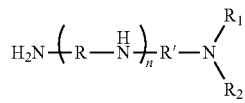

wherein each R and R', independently, is a divalent $C_1$ to $C_6$ alkylene linker, each $R_1$ and $R_2$, independently, is hydrogen, a $C_1$ to $C_6$ alkyl group, or together with the nitrogen atom to which they are attached form a 5- or 6-membered ring optionally fused with one or more aromatic or non-aromatic rings, and n is an integer from 0 to 8. In other approaches, the polyalkylene polyamine is selected from the group consisting of a mixture of polyethylene polyamines having an average of 5 to 7 nitrogen atoms, triethylenetetramine, tetraethylenepentamine, and combinations thereof.

The dispersant, if present, can be used in an amount sufficient to provide up to about 20 wt %, based upon the final weight of the lubricating oil composition. Another amount of the dispersant that can be used may be about 0.1 wt % to about 15 wt %, or about 0.1 wt % to about 10 wt %, about 0.1 to 8 wt %, or about 1 wt % to about 10 wt %, or about 1 wt % to about 8 wt %, or about 1 wt % to about 6 wt %, based upon the final weight of the lubricating oil composition. In some embodiments, the lubricating oil composition utilizes a mixed dispersant system. A single type or a mixture of two or more types of dispersants in any desired ratio may be used.

Other Antioxidants: The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox® L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox™ 4716 available from SI Group.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5%, by weight, based upon the final weight of the lubricating oil composition. In an embodiment, the antioxidant may be a mixture of about 0.3 to about 1.5% diarylamine and about 0.4 to about 2.5% high molecular weight phenol, by weight, based upon the final weight of the lubricating oil composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

In another alternative embodiment the antioxidant composition also contains a molybdenum-containing antioxidant in addition to the phenolic and/or aminic antioxidants discussed above. When a combination of these three antioxidants is used, preferably the ratio of phenolic to aminic to molybdenum-containing component treat rates is (0 to 3):(0 to 3):(0 to 3).

The one or more antioxidant(s) may be present in ranges about 0 wt % to about 20 wt %, or about 0.1 wt % to about 10 wt %, or about 1 wt % to about 5 wt %, of the lubricating oil composition.

Antiwear Agents: The lubricating oil compositions herein also may optionally contain one or more antiwear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl)disulfides; and mixtures thereof. A suitable antiwear agent may be a molybdenum dithiocarbamate. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkyldithiophosphate.

Further examples of suitable antiwear agents include titanium compounds, tartrates, tartrimides, oil-soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl)disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt % to about 15 wt %, or about 0.01 wt % to about 10 wt %, or about 0.05 wt % to about 5 wt %, or about 0.1 wt % to about 3 wt % of the lubricating oil composition.

Boron-Containing Compounds: The lubricating oil compositions herein may optionally contain one or more boron-containing compounds. Examples of boron-containing compounds include borate esters, borated fatty amines, borated epoxides, borated detergents, and borated dispersants, such as borated succinimide dispersants, as disclosed in U.S. Pat. No. 5,883,057. The boron-containing compound, if present, can be used in an amount sufficient to provide up to about 8 wt %, about 0.01 wt % to about 7 wt %, about 0.05 wt % to about 5 wt %, or about 0.1 wt % to about 3 wt % of the lubricating oil composition.

Detergents: The lubricating oil composition may optionally further comprise one or more neutral, low based, or overbased detergents, and mixtures thereof. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein.

The detergent substrate may be salted with an alkali or alkaline earth metal such as, but not limited to, calcium, magnesium, potassium, sodium, lithium, barium, or mixtures thereof. In some embodiments, the detergent is free of barium. In some embodiments, a detergent may contain traces of other metals such as magnesium or calcium in amounts such as 50 ppm or less, 40 ppm or less, 30 ppm or less, 20 ppm or less, or 10 ppm or less. A suitable detergent may include alkali or alkaline earth metal salts of petroleum sulfonic acids and long chain mono- or di-alkylarylsulfonic acids with the aryl group being benzyl, tolyl, and xylyl. Examples of suitable detergents include, but are not limited to, calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, or phenols.

An overbased detergent of the lubricating oil composition may have a total base number (TBN) of about 200 mg KOH/g or greater, or as further examples, about 250 mg KOH/g or greater, or about 350 mg KOH/g or greater, or about 375 mg KOH/g or greater, or about 400 mg KOH/g or greater. The TBN being measured by the method of ASTM D2896.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased calcium phenate detergents have a total base number of at least about 150 mg KOH/g, at least about 225 mg KOH/g, at least about 225 mg KOH/g to about 400 mg KOH/g, at least about 225 mg KOH/g to about 350 mg KOH/g or about 230 mg KOH/g to about 350 mg KOH/g, all as measured by the method of ASTM D2896. When such detergent compositions are formed in an inert diluent, e.g., a process oil, usually a mineral oil, the total base number reflects the basicity of the overall composition including diluent, and any other materials (e.g., promoter, etc.) that may be contained in the detergent composition.

The overbased detergent may have a metal to substrate ratio of from 1.1:1, or from 2:1, or from 4:1, or from 5:1, or from 7:1, or from 10:1. In some embodiments, a detergent is effective at reducing or preventing rust in an engine or other automotive part such as a transmission or gear. The detergent may be present in a lubricating composition at about 0 wt % to about 10 wt %, or about 0.1 wt % to about 8 wt %, or about 1 wt % to about 4 wt %, or greater than about 4 wt % to about 8 wt %.

Extreme Pressure Agents: The lubricating oil compositions herein also may optionally contain one or more extreme pressure agents. Extreme Pressure (EP) agents that are soluble in the oil include sulfur- and chlorosulfur-containing EP agents, chlorinated hydrocarbon EP agents and phosphorus EP agents. Examples of such EP agents include chlorinated wax; organic sulfides and polysulfides such as dibenzyldisulfide, bis(chlorobenzyl)disulfide, dibutyl tetrasulfide, sulfurized methyl ester of oleic acid, sulfurized alkyl phenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbyl and trihydrocarbyl phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenyl phosphite; metal thiocarbamates such as zinc dioctyldithiocarbamate and barium heptylphenol diacid; amine salts of alkyl and dialkylphosphoric acids, including, for example, the amine salt of the reaction product of a dialkyldithiophosphoric acid with propylene oxide; and mixtures thereof.

Friction Modifiers: The lubricating oil compositions herein also may optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a diester, or a (tri)glyceride. The friction modifier may be a long chain fatty amide, a long chain fatty ester, a long chain fatty epoxide derivatives, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g., carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

A friction modifier may optionally be present in ranges such as about 0 wt % to about 10 wt %, or about 0.01 wt % to about 8 wt %, or about 0.1 wt % to about 4 wt %.

Molybdenum-containing component: The lubricating oil compositions herein also may optionally contain one or more molybdenum-containing compounds. An oil-soluble molybdenum compound may have the functional performance of an antiwear agent, an antioxidant, a friction modifier, or mixtures thereof. An oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan® 822, Molyvan® A, Molyvan® 2000, Molyvan® 855, Molyvan® 1055, and Molyvan® 3000 from R. T. Vanderbilt Co., Ltd., and Adeka Sakura-Lube® S-165, S-200, S-300, S-310G, S-525, S-600, S-700, and S-710 available from Adeka Corporation, and mixtures thereof. Suitable molybdenum components are described in U.S. Pat. No. 5,650,381; US RE 37,363 E1; US RE 38,929 E1; and US RE 40,595 E1, incorporated herein by reference in their entireties.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897, incorporated herein by reference in their entireties.

Another class of suitable organo-molybdenum compounds are trinuclear molybdenum compounds, such as those of the formula $Mo_3S_kL_nQ_z$ and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in an amount sufficient to provide about 0.5 ppm to about 2000 ppm, about 1 ppm to about 700 ppm, about 1 ppm to about 550 ppm, about 5 ppm to about 300 ppm, or about 20 ppm to about 250 ppm of molybdenum.

Transition Metal-containing compounds: In another embodiment, the oil-soluble compound may be a transition metal containing compound or a metalloid. The transition metals may include, but are not limited to, titanium, vanadium, copper, zinc, zirconium, molybdenum, tantalum, tungsten, and the like. Suitable metalloids include, but are not limited to, boron, silicon, antimony, tellurium, and the like.

In an embodiment, an oil-soluble transition metal-containing compound may function as antiwear agents, friction modifiers, antioxidants, deposit control additives, or more than one of these functions. In an embodiment the oil-soluble transition metal-containing compound may be an oil-soluble titanium compound, such as a titanium (IV) alkoxide. Among the titanium containing compounds that may be used in, or which may be used for preparation of the oils-soluble materials of, the disclosed technology are various Ti (IV) compounds such as titanium (IV) oxide; titanium (IV) sulfide; titanium (IV) nitrate; titanium (IV) alkoxides such as titanium methoxide, titanium ethoxide, titanium propoxide, titanium isopropoxide, titanium butoxide, titanium 2-ethylhexoxide; and other titanium compounds or complexes including but not limited to titanium phenates; titanium carboxylates such as titanium (IV) 2-ethyl-1-3-hexanedioate or titanium citrate or titanium oleate; and titanium (IV) (triethanolaminato)isopropoxide. Other forms of titanium encompassed within the disclosed technology include titanium phosphates such as titanium dithiophosphates (e.g., dialkyldithiophosphates) and titanium sulfonates (e.g., alkylbenzenesulfonates), or, generally, the reaction product of titanium compounds with various acid materials to form salts, such as oil-soluble salts. Titanium compounds can thus be derived from, among others, organic acids, alcohols, and glycols. Ti compounds may also exist in dimeric or oligomeric form, containing Ti—O—Ti structures. Such titanium materials are commercially available or can be readily prepared by appropriate synthesis techniques which will be apparent to the person skilled in the art. They may exist at room temperature as a solid or a liquid, depending on the particular compound. They may also be provided in a solution form in an appropriate inert solvent.

In one embodiment, the titanium can be supplied as a Ti-modified dispersant, such as a succinimide dispersant. Such materials may be prepared by forming a titanium mixed anhydride between a titanium alkoxide and a hydrocarbyl-substituted succinic anhydride, such as an alkenyl-(or alkyl) succinic anhydride. The resulting titanate-succinate intermediate may be used directly or it may be reacted with any of a number of materials, such as (a) a polyamine-based succinimide/amide dispersant having free, condensable —NH functionality; (b) the components of a polyamine-based succinimide/amide dispersant, i.e., an alkenyl-(or alkyl-) succinic anhydride and a polyamine, (c) a hydroxy-containing polyester dispersant prepared by the reaction of a substituted succinic anhydride with a polyol, aminoalcohol, polyamine, or mixtures thereof. Alternatively, the titanate-succinate intermediate may be reacted with other agents such as alcohols, aminoalcohols, ether alcohols, polyether alcohols or polyols, or fatty acids, and the product thereof either used directly to impart Ti to a lubricant, or else further reacted with the succinic dispersants as described above. As an example, 1 part (by mole) of tetraisopropyl titanate may be reacted with about 2 parts (by mole) of a polyisobutene-substituted succinic anhydride at 140-150° C. for 5 to 6 hours to provide a titanium modified dispersant or intermediate. The resulting material (30 g) may be further reacted with a succinimide dispersant from polyisobutene-substituted succinic anhydride and a polyethylenepolyamine mixture (127 grams+diluent oil) at 150° C. for 1.5 hours, to produce a titanium-modified succinimide dispersant.

Another titanium containing compound may be a reaction product of titanium alkoxide and $C_6$ to $C_{25}$ carboxylic acid. The reaction product may be represented by the following formula:

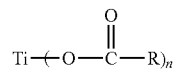

wherein n is an integer selected from 2, 3 and 4, and R is a hydrocarbyl group containing from about 5 to about 24 carbon atoms, or by the formula:

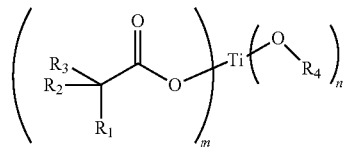

wherein m+n=4 and n ranges from 1 to 3, $R_4$ is an alkyl moiety with carbon atoms ranging from 1-8, $R_1$ is selected from a hydrocarbyl group containing from about 6 to 25 carbon atoms, and $R_2$ and $R_3$ are the same or different and are selected from a hydrocarbyl group containing from about 1 to 6 carbon atoms, or the titanium compound may be represented by the formula:

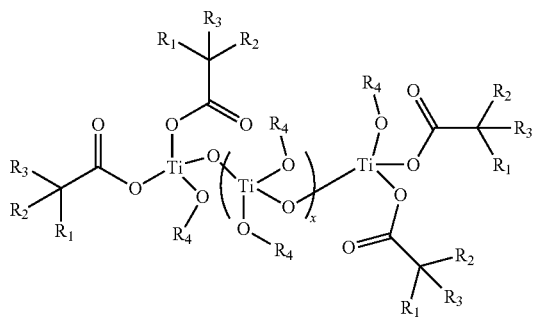

wherein x ranges from 0 to 3, $R_1$ is selected from a hydrocarbyl group containing from about 6 to 25 carbon atoms, $R_2$, and $R_3$ are the same or different and are selected from a hydrocarbyl group containing from about 1 to 6 carbon atoms, and $R_4$ is selected from a group consisting of either H, or $C_6$ to $C_{25}$ carboxylic acid moiety.

Suitable carboxylic acids may include, but are not limited to caproic acid, caprylic acid, lauric acid, myristic acid, palmitic acid, stearic acid, arachidic acid, oleic acid, erucic acid, linoleic acid, linolenic acid, cyclohexanecarboxylic acid, phenylacetic acid, benzoic acid, neodecanoic acid, and the like.

In an embodiment the oil-soluble titanium compound may be present in the lubricating oil composition in an amount to provide from 0 to 3000 ppm titanium by weight or 25 to about 1500 ppm titanium by weight or about 35 ppm to 500 ppm titanium by weight or about 50 ppm to about 300 ppm.

Viscosity Index Improvers: The lubricating oil compositions herein also may optionally contain one or more viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Publication No. 20120101017A1.

The lubricating oil compositions herein also may optionally contain one or more dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine or esterified maleic anhydride-styrene copolymers reacted with an amine.

The total amount of viscosity index improver and/or dispersant viscosity index improver may be about 0 wt % to about 20 wt %, about 0.1 wt % to about 15 wt %, about 0.1 wt % to about 12 wt %, or about 0.5 wt % to about 10 wt %, of the lubricating oil composition.

Other Optional Additives: Other additives may be selected to perform one or more functions required of a lubricating fluid. Further, one or more of the mentioned additives may be multi-functional and provide functions in addition to or other than the function prescribed herein.

A lubricating oil composition according to the present disclosure may optionally comprise other performance additives. The other performance additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these performance additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include polymethylmethacrylates or mixtures thereof. Pour point depressants may be present in an amount sufficient to provide from about 0 wt % to about 1 wt %, about 0.01 wt % to about 0.5 wt %, or about 0.02 wt % to about 0.04 wt % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid.

The rust inhibitor, if present, can be used in an amount sufficient to provide about 0 wt % to about 5 wt %, about 0.01 wt % to about 3 wt %, about 0.1 wt % to about 2 wt %, based upon the final weight of the lubricating oil composition.

In general terms, a suitable lubricant including the detergent metals herein may include additive components in the ranges listed in the following table.

TABLE 2

| Component | Wt. % (Suitable Embodiments) | Wt. % (Suitable Embodiments) |
| --- | --- | --- |
| Oil-Soluble Silicon-Containing Compound | 0.1-0.5 | 0.2-0.3 |
| Detergent | 0.02-5.0 | 0.2-2.0 |
| Dispersant | 0-8.0 | 1-6.0 |
| Antioxidant(s) | 0.1-5.0 | 0.01-3.0 |
| Ashless TBN booster(s) | 0.0-1.0 | 0.01-0.5 |
| Corrosion inhibitor(s) | 0.0-5.0 | 0.0-2.0 |
| Metal dihydrocarbyldithiophosphate(s) | 0.0-6.0 | 0.1-4.0 |
| Ash-free phosphorus compound(s) | 0.0-6.0 | 0.0-4.0 |
| Antifoaming agent(s) | 0.0-5.0 | 0.001-0.15 |
| Antiwear agent(s) | 0.0-1.0 | 0.0-0.8 |
| Pour point depressant(s) | 0.0-5.0 | 0.01-1.5 |
| Viscosity index improver(s) | 0.0-25.0 | 0.1-15.0 |
| Dispersant viscosity index improver(s) | 0.0-10.0 | 0.0-5.0 |
| Friction modifier(s) | 0.00-5.0 | 0.01-2.0 |
| Base oil | Balance | Balance |
| Total | 100 | 100 |

The percentages of each component above represent the weight percent of each component, based upon the weight of the final lubricating oil composition. The remainder of the lubricating oil composition consists of one or more base oils. Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent). Fully formulated lubricants conventionally contain an additive package, referred to herein as a dispersant/inhibitor package or DI package, that will supply the characteristics that are required in the formulation.

Definitions

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausolito: 1999, and "March's Advanced Organic Chemistry", 5th Ed., Ed.: Smith, M. B. and March, J., John Wiley & Sons, New York: 2001, the entire contents of which are hereby incorporated by reference.

As described herein, compounds may optionally be substituted with one or more substituents, such as are illustrated generally above, or as exemplified by particular classes, subclasses, and species of the disclosure.

Unless otherwise apparent from the context, the term "major amount" is understood to mean an amount greater than or equal to 50 weight percent, for example, from about 80 to about 98 weight percent relative to the total weight of the composition. Moreover, as used herein, the term "minor amount" is understood to mean an amount less than 50 weight percent relative to the total weight of the composition.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); (3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

As used herein the term "aliphatic" encompasses the terms alkyl, alkenyl, alkynyl, each of which being optionally substituted as set forth below.

As used herein, an "alkyl" group refers to a saturated aliphatic hydrocarbon group containing 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic [e.g., cycloalkyl or cycloalkenyl], heterocycloaliphatic [e.g., heterocycloalkyl or heterocycloalkenyl], aryl, heteroaryl, alkoxy, aroyl, heteroaroyl, acyl [e.g., (aliphatic) carbonyl, (cycloaliphatic) carbonyl, or (heterocycloaliphatic) carbonyl], nitro, cyano, amido [e.g., (cycloalkylalkyl) carbonylamino, arylcarbonylamino, aralkylcarbonylamino, (heterocycloalkyl) carbonylamino, (heterocycloalkylalkyl) carbonylamino, heteroarylcarbonylamino, heteroaralkyl carbonylamino, alkylaminocarbonyl, cycloalkylaminocarbonyl, heterocycloalkylaminocarbonyl, arylaminocarbonyl, or heteroarylaminocarbonyl], amino [e.g., aliphaticamino, cycloaliphatic amino, or heterocycloaliphaticamino], sulfonyl [e.g., aliphatic-$SO_2$—], sulfinyl, sulfanyl, sulfoxy, urea, thiourea, sulfamoyl, sulfamide, oxo, carboxy, carbamoyl, cycloaliphaticoxy, heterocyclo aliphaticoxy, aryloxy, heteroaryloxy, aralkyloxy, heteroarylalkoxy, alkoxycarbonyl, alkyl carbonyloxy, or hydroxy. Without limitation, some examples of substituted alkyls include carboxyalkyl (such as HOOC-alkyl, alkoxycarbonylalkyl, and alkylcarbonyloxyalkyl), cyanoalkyl, hydroxyalkyl, alkoxyalkyl, acylalkyl, aralkyl, (alkoxyaryl) alkyl, (sulfonylamino)alkyl (such as (alkyl-$SO_2$-amino)alkyl), aminoalkyl, amidoalkyl, (cycloaliphatic)alkyl, or haloalkyl.

As used herein, an "alkenyl" group refers to an aliphatic carbon group that contains 2-8 (e.g., 2-12, 2-6, or 2-4) carbon atoms and at least one double bond. Like an alkyl group, an alkenyl group can be straight or branched. Examples of an alkenyl group include, but are not limited to, allyl, isoprenyl, 2-butenyl, and 2-hexenyl. An alkenyl group can be optionally substituted with one or more substituents such as halo, phospho, cycloaliphatic [e.g., cycloalkyl or cycloalkenyl], heterocycloaliphatic [e.g., heterocycloalkyl or hetero cycloalkenyl], aryl, heteroaryl, alkoxy, aroyl, heteroaroyl, acyl [e.g., (aliphatic) carbonyl, (cycloaliphatic) carbonyl, or (heterocycloaliphatic) carbonyl], nitro, cyano, amido [e.g., (cycloalkylalkyl) carbonylamino, arylcarbonylamino, aralkylcarbonylamino, (hetero cycloalkyl) carbonylamino, (heterocyclo alkylalkyl) carbonylamino, heteroarylcarbonylamino, heteroaralkylcarbonylamino alkylamino carbonyl, cycloalkylaminocarbonyl, hetero cyclo alkylaminocarbonyl, arylaminocarbonyl, or heteroarylaminocarbonyl], amino [e.g., aliphaticamino, cycloaliphaticamino, heterocyclo aliphaticamino, or aliphaticsulfonylamino], sulfonyl [e.g., alkyl-$SO_2$—, cycloaliphatic-$SO_2$—, or aryl-$SO_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroaralkoxy, alkoxycarbonyl, alkylcarbonyloxy, or hydroxy. Without limitation, some examples of substituted alkenyls include cyanoalkenyl, alkoxyalkenyl, acylalkenyl, hydroxyl alkenyl, aralkenyl, (alkoxyaryl)alkenyl, (sulfonylamino)alkenyl (such as (alkyl-$SO_2$-amino)alkenyl), aminoalkenyl, amidoalkenyl, (cycloaliphatic)alkenyl, or haloalkenyl.

As used herein, an "alkynyl" group refers to an aliphatic carbon group that contains 2-8 (e.g., 2-12, 2-6, or 2-4) carbon atoms and has at least one triple bond. An alkynyl group can be straight or branched. Examples of an alkynyl group include, but are not limited to, propargyl and butynyl. An alkynyl group can be optionally substituted with one or more substituents such as aroyl, heteroaroyl, alkoxy, cycloalkyloxy, heterocycloalkyloxy, aryloxy, heteroaryloxy, aralkyl oxy, nitro, carboxy, cyano, halo, hydroxy, sulfo, mercapto, sulfanyl [e.g., aliphaticsulfanyl or cycloaliphaticsulfanyl], sulfinyl [e.g., aliphaticsulfinyl or cycloaliphaticsulfinyl], sulfonyl [e.g., aliphatic-$SO_2$—, aliphaticamino-$SO_2$—, or cycloaliphatic-$SO_2$—], amido [e.g., aminocarbonyl, alkylaminocarbonyl, alkylcarbonylamino, cyclo alkylaminocarbonyl, heterocycloalkylaminocarbonyl, cycloalkylcarbonylamino, arylamino carbonyl, arylcarbonylamino, aralkylcarbonylamino, (heterocycloalkyl) carbonylamino, (cycloalkylalkyl) carbonylamino, heteroaralkylcarbonylamino, heteroaryl carbonylamino or heteroaryl amino carbonyl], urea, thiourea, sulfamoyl, sulfamide, alkoxycarbonyl, alkyl carbonyloxy, cyclo aliphatic, heterocycloaliphatic, aryl, heteroaryl, acyl [e.g., (cycloaliphatic) carbonyl or (hetero cyclo aliphatic) carbonyl], amino [e.g., aliphaticamino], sulfoxy, oxo, carboxy, carbamoyl, (cycloaliphatic)oxy, (heterocyclo aliphatic)oxy, or (heteroaryl)alkoxy.

As used herein, an "amino" group refers to —$N^RX^RY$ wherein each of $R^X$ and $R^Y$ is independently hydrogen, alkyl, cycloalkyl, (cycloalkyl)alkyl, aryl, aralkyl, heterocycloalkyl, (heterocycloalkyl)alkyl, heteroaryl, carboxy, sulfanyl, sulfinyl, sulfonyl, (alkyl) carbonyl, (cycloalkyl) carbonyl, ((cycloalkyl)alkyl) carbonyl, arylcarbonyl, (aralkyl) carbonyl, (heterocyclo alkyl) carbonyl, ((heterocycloalkyl)alkyl) carbonyl, (heteroaryl) carbonyl, or (heteroaralkyl) carbonyl, each of which being defined herein and being optionally substituted. Examples of amino groups include alkylamino, dialkylamino, or arylamino. When the term "amino" is not the terminal group (e.g., alkylcarbonylamino), it is represented by —$NR^X$—. $R^X$ has the same meaning as defined above.

As used herein, a "cycloalkyl" group refers to a saturated carbocyclic mono- or bicyclic (fused or bridged) ring of 3-10 (e.g., 5-10) carbon atoms. Examples of cycloalkyl groups include cyclopropyl, cyclobutyl, cyclopentyl, cyclohexyl, cycloheptyl, adamantyl, norbornyl, cubyl, octahydroindenyl, decahydro-naphthyl, bicyclo[3.2.1]octyl, bicyclo[2.2.2]octyl, bicyclo[3.3.1]nonyl, bicyclo[3.3.2.]decyl, bicyclo[2.2.2]octyl, adamantyl, or ((aminocarbonyl)cycloalkyl) cycloalkyl.

As used herein, a "heterocycloalkyl" group refers to a 3-10 membered mono- or bicyclic (fused or bridged) (e.g., 5- to 10-membered mono- or bicyclic) saturated ring structure, in which one or more of the ring atoms is a heteroatom (e.g., N, O, S, or combinations thereof). Examples of a heterocycloalkyl group include piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydrobenzofuryl, octahydrochromenyl, octahydrothio chromenyl, octahydroindolyl, octahydropyrindinyl, decahydroquinolinyl, octahydrobenzo[b]thiopheneyl, 2-oxa-bicyclo[2.2.2]octyl, 1-aza-bicyclo[2.2.2]octyl, 3-aza-bicyclo[3.2.1]octyl, and 2,6-dioxa-tricyclo [3.3.1.0]nonyl. A monocyclic heterocycloalkyl group can be fused with a phenyl moiety to form structures, such as tetrahydroisoquinoline, which would be categorized as heteroaryls.

A "heteroaryl" group, as used herein, refers to a monocyclic, bicyclic, or tricyclic ring system having 4 to 15 ring atoms wherein one or more of the ring atoms is a heteroatom (e.g., N, O, S, or combinations thereof) and in which the monocyclic ring system is aromatic or at least one of the rings in the bicyclic or tricyclic ring systems is aromatic. A heteroaryl group includes a benzofused ring system having 2 to 3 rings. For example, a benzofused group includes benzo fused with one or two 4 to 8 membered heterocycloaliphatic moieties (e.g., indolizyl, indolyl, isoindolyl, 3H-indolyl, indolinyl, benzo[b]furyl, benzo[b]thiophenyl, quinolinyl, or isoquinolinyl). Some examples of heteroaryl are pyridyl, 1H-indazolyl, furyl, pyrrolyl, thienyl, thiazolyl, oxazolyl, imidazolyl, tetrazolyl, benzofuryl, isoquinolinyl, benzothiazolyl, xanthene, thioxanthene, phenothiazine, dihydroindole, benzo[1,3]dioxole, benzo[b]furyl, benzo[b] thiophenyl, indazolyl, benzimidazolyl, benzthiazolyl, puryl, cinnolyl, quinolyl, quinazolyl, cinnolyl, phthalanyl, quinazolyl, quinoxalyl, isoquinolyl, 4H-quinolizyl, benzo-1,2, 5-thiadiazolyl, or 1,8-naphthyridyl.

Without limitation, monocyclic heteroaryls include furyl, thiophenyl, 2H-pyrrolyl, pyrrolyl, oxazolyl, thiazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, or 1,3,5-triazyl. Monocyclic heteroaryls are numbered according to standard chemical nomenclature.

Without limitation, bicyclic heteroaryls include indolizyl, indolyl, isoindolyl, 3H-indolyl, indolinyl, benzo[b]furyl, benzo[b]thiophenyl, quinolinyl, isoquinolinyl, indolizinyl, isoindolyl, indolyl, benzo[b]furyl, bexo[b]thiophenyl, indazolyl, benzimidazyl, benzthiazolyl, purinyl, 4H-quinolizyl, quinolyl, isoquinolyl, cinnolyl, phthalazyl, quinazolyl, quinoxalyl, 1,8-naphthyridyl, or pteridyl. Bicyclic heteroaryls are numbered according to standard chemical nomenclature.

As used herein, the term "treat rate" refers to the weight percent of a component in the finished lubricant or the passenger car motor oil.

The weight average molecular weight (Mw) and the number average molecular weight (Mn) may be determined with a gel permeation chromatography (GPC) instrument obtained from Waters or the like instrument and the data processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5μ, and pore size ranging from 100-10000 Å) with the column temperature at about 40° C. Un-stabilized HPLC grade tetrahydrofuran (THF) may be used as solvent, at a flow rate of 1.0 mL/min. The GPC instrument may be calibrated with commercially available poly(methyl methacrylate) (PMMA) standards having a narrow molecular weight distribution ranging from 960-1,568,000 g/mol. The calibration curve can be extrapolated for samples having a mass less than 500 g/mol. Samples and PMMA standards can be in dissolved in THF and prepared at concentration of 0.1 to 0.5 wt. % and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

The following definitions of terms are provided in order to clarify the meanings of certain terms as used herein.

The terms "oil composition," "lubrication composition," "lubricating oil composition," "lubricating oil," "lubricant composition," "lubricating composition," "fully formulated lubricant composition," and "lubricant" are considered synonymous, fully interchangeable terminology referring to the finished lubrication product comprising a major amount of a base oil plus a minor amount of an additive composition.

As used herein, the terms "additive package," "additive concentrate," and "additive composition" are considered synonymous, fully interchangeable terminology referring the portion of the lubricating oil composition excluding the major amount of base oil stock mixture.

The term "overbased," unless otherwise specified, relates to metal salts, such as metal salts of sulfonates, carboxylates, salicylates, and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, salicylates, sulfonates, and/or phenols.

The term "alkaline earth metal" relates to calcium, barium, magnesium, and strontium, and the term "alkali metal" refers to lithium, sodium, potassium, rubidium, and cesium.

As used herein, and unless otherwise specified, the term "hydrocarbyl" or "hydrocarbyl substituent" or "hydrocarbyl group" is used in its ordinary sense, which is well-known to those skilled in the art. Specifically, it refers to a group having a carbon atom directly attached to the remainder of the molecule and having a predominantly hydrocarbon character. Each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents are present for every ten carbon atoms in the hydrocarbyl group. In some embodiments, hydrocarbyl includes the term "alkyl." The term "alkyl" as employed herein and unless otherwise specified, refers to straight, branched, cyclic, and/or substituted saturated chain moieties of from about 1 to about 100 carbon atoms. The term "alkenyl" as employed herein refers to straight, branched, cyclic, and/or substituted unsaturated chain moieties of from about 3 to about 10 carbon atoms. The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

As used herein, and unless otherwise specified, the term "hydrocarbylene substituent" or "hydrocarbylene group" is used in its ordinary sense, which is well-known to those skilled in the art. Specifically, it refers to a group that is directly attached at two locations of the molecule to the remainder of the molecule by a carbon atom and having predominantly hydrocarbon character. Each hydrocarbylene group is independently selected from divalent hydrocarbon substituents, and substituted divalent hydrocarbon substituents containing halo groups, alkyl groups, aryl groups, alkylaryl groups, arylalkyl groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents is present for every ten carbon atoms in the hydrocarbylene group.

As used herein, the term "percent by weight", unless expressly stated otherwise, means the percentage the recited component represents to the weight of the entire composition.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g as measured by the method of ASTM D2896.

EXAMPLES

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion in the Examples below and throughout this disclosure, all percentages, ratios, and parts noted in this disclosure are by weight. KV100 is measured herein pursuant to ASTM D445.

Example 1

Inventive and Comparative lubricants were used to evaluate the performance of a three-way catalyst after about 125,000 miles of vehicle operation generally pursuant to a drive cycle exemplified in the speed vs time graph of FIG. 1. The Inventive and Comparative lubricants were used in a 2018 model year Chevy Cruz having a L4-1.4 L turbo engine. Throughout the evaluation, each Inventive or Comparative lubricant was changed during the testing every 5000 miles and replaced with fresh Inventive or Comparative lubricant.

The Comparative lubricant included a base oil blend, a DI package, and viscosity index improver that was formulated as a passenger car motor oil including a dispersant, a borated dispersant, an antioxidant, a friction modifier, detergent, antiwear agents, a pour point depressant, and antifoamant. The Comparative lubricant had negligible levels of silicon at about 6 ppm. The Inventive lubricant was identical to the Comparative lubricant but top-treated with about 0.27 weight percent of hexadecyltrimethoxysilane providing about 200 ppm of silicon to the Inventive lubricant.

Example 2

The initial BET surface area was measured for a de-greened three-way catalyst (approximately 7,000 miles of real-world operation) and compared to the BET surface area of the used catalysts from the inventive and comparative vehicles of Example 1 after being exposed to the exhaust gas from combusting engines lubricated with either the Inventive or Comparative lubricants after the 125,000 miles of operation using the specified drive cycle. Surface area was measured at Southwest Research Institute. Results are provided in Table 3 below and FIG. 2.

TABLE 3

| BET Surface Area | | |
| --- | --- | --- |
| Degreened | Comparative | Inventive |
| 24.9 m$^2$/g$_{cat}$ | 10.4 m$^2$/g$_{cat}$ | 23.8 m$^2$/g$_{cat}$ |
| — | 58.2% reduction* | 4.4% reduction* |

*% reduction of surface area is end-of-test surface area relative to the initial (or de-greened) surface area Example 3

The oxygen storage capacity was measured for a de-greened three-way catalyst (approximately 7,000 miles of real-world operation) and compared to the oxygen storage capacity of catalysts from the inventive and comparative vehicles of Example 1 using either the Inventive or Comparative lubricants after the 125,000 miles of operation. Oxygen storage capacity was measured at Southwest Research Institute. Results are provided in Table 4 below and FIG. 3.

TABLE 4

| Oxygen Storage Capacity | | |
| --- | --- | --- |
| Degreened | Comparative | Inventive |
| 0.000255 mol oxygen/g$_{cat}$ | 0.000161 mol oxygen/g$_{cat}$ 36.9% reduction* | 0.000183 mol oxygen/g$_{cat}$ 28.2% reduction* |

*% reduction of oxygen storage capacity (OSC) is end-of-test OSC relative to initial (or de-greened) OSC Example 4

The light-off temperatures were measured for a de-greened three-way catalyst (approximately 7,000 miles of real-world operation) and compared to the light-off temperatures of catalysts from the inventive and comparative vehicles of Example 1 using either the Inventive or Comparative lubricants after the 125,000 miles of operation. Light-off temperatures were measured at Southwest Research Institute. Results are provided in Table 5 below and FIG. 4.

TABLE 5

| | Light-Off Temperatures | | | |
| --- | --- | --- | --- | --- |
| | CO T50, ° C. (%*) | CO T90, ° C. (%*) | C3H8 T50, ° C. (%*) | C3H8 T90, ° C. (%*) |
| Degreened | 203 | 206 | 340 | 438 |
| Comparative | 221 (8.9%) | 226 (9.7%) | 425 (25%) | 555 (26.7%) |
| Inventive | 210 (3.4%) | 215 (4.4%) | 391 (15%) | 480 (9.5%) |

*% change of temperature is end-of-test temperature relative to initial (or de-greened) temperature It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the end-point values within the broad range is also discussed herein.

Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of improving the performance of an after-treatment device for a combustion engine, the method comprising:

lubricating the combustion engine with a lubricating oil composition and combusting a fuel in the lubricated engine generating an exhaust stream including soot and/or ash particles derived from the combustion, wherein the lubricating oil composition includes one or more base oils of lubricating viscosity and an additive package including at least one oil-soluble silicon-containing compound providing from about 150 to about 250 ppm of silicon to the lubricating oil composition and wherein the silicon-containing compound is selected from undecyltriethoxysilane, tetradecyltriethoxysilane, hexadecyltrimethoxy silane, or combinations thereof and wherein the lubricating oil composition includes greater than 1 weight percent to 6 weight percent of zinc dialkyldithiophosphate;

contacting the after-treatment device with the exhaust stream including the soot and/or the ash particles from the combustion;

measuring oxygen storage capacity and/or CO $T_{50}$ light-off temperature of the after-treatment device after at least about 120,000 miles of operation; and when measured by oxygen storage capacity, then the oxygen storage capacity of the after-treatment device after at least about 120,000 miles of operation is no more than 30 percent less than an initial oxygen storage capacity of the after-treatment device; or when measured by CO $T_{50}$ light-off temperature, then the CO $T_{50}$ light-off temperature of the after-treatment device after at least about 120,000 miles of operation is no more than 5 percent higher than an initial CO $T_{50}$ light-off temperature of the after-treatment device.

2. The method of claim 1, wherein the after-treatment device is selected from a three-way catalytic converter, a particulate filter, or combinations thereof.

3. The method of claim 1, wherein the combustion engine is a gasoline engine or a diesel engine.

4. The method of claim 1, wherein the soot or ash particles have a diameter of about 10 nm or less.

5. The method of claim 4, wherein the soot or ash particles aggregate into particles having a diameter up to 200 micrometers.

6. The method of claim 1, wherein the exhaust stream has $1 \times 10^{12}$ to $1 \times 10^{13}$ of soot and/or ash as measured by particulate number (PN) during hot operation.

7. The method of claim 1, wherein the lubricating oil composition has a calculated SASH value of 0.4 to 2.0 weight percent.

8. The method of claim 1, wherein the oil-soluble silicon-containing compound is hexadecyltrimethoxysilane.

9. The method of claim 8, wherein the oil-soluble silicon-containing compound provides about 180 to about 220 ppm of silicon to the lubricating oil composition.

* * * * *